United States Patent

[11] 3,619,571

[72] Inventors Soichiro Kage; Kenzo Takahashi; Tadahiro Tanaka; Yutaka Nakazima, all of Tokyo, Japan

[21] Appl. No. 869,774

[22] Filed Oct. 27, 1969

[45] Patented Nov. 9, 1971

[73] Assignee Tokyo Shibaura Electric Co., Ltd. Kawasaki-shi, Japan

[32] Priority Oct. 29, 1968

[33] Japan

[31] 43/78452

[54] TAPE READING-OUT SYSTEM

19 Claims, 31 Drawing Figs.

[52] U.S. Cl. .......... 235/61.11 E, 226/120, 340/173 R

[51] Int. Cl. .......... G06k 7/10

[50] Field of Search .......... 340/174.1 A, 173, 174.1 H, 173 R, 174.1 A; 235/61.11 C, 61.11 E, 61.6 H; 226/48, 120, 134

[56] References Cited

UNITED STATES PATENTS

| | | | |
|---|---|---|---|
| 2,931,689 | 4/1960 | Dupy | 340/174.1 UX |
| 3,275,208 | 9/1966 | Poumakis | 340/174.1 UX |
| 3,351,744 | 11/1967 | Masterson | 235/61.11 E |
| 3,394,853 | 7/1968 | Foley et al. | 226/134 |
| 3,522,417 | 8/1970 | Walstrom | 235/61.11 C |

*Primary Examiner*—Maynard R. Wilbur

*Assistant Examiner*—Leo H. Boudreau

*Attorney*—Flynn & Frishauf

ABSTRACT: A tape reading-out system comprising a tape driving means equipped with a clutch having rotary shafts for allowing a tape stored with information to be moved forward, means for detecting signals directing the travel and stop of said tape from the displaced rotation of the rotary shaft of said clutch and a circuit enabling the rotary shafts of said clutch to rotate or stop and controlling the reading of information out of the tape by controlling the operation of said clutch using said detected directing signals.

TAPE READING-OUT SYSTEM

The present invention relates to a system for reading information out of a paper tape or the like used in, for example, an electronic computer, and more particularly to a system for feeding said tape.

Generally with the paper tape of an electronic computer, there are formed, as shown in FIG. 1 at an equal interval a plurality of feed holes 101, 102, ... lengthwise along a substantially central line and there is stored information by apertures 201, 202, ... arranged across the tape.

There has heretofore been employed a reading-out system involving a spring clutch which allows a paper tape to be moved forward from row to row of said information-storing apertures by engaging the feed holes of the paper tape with the gear teeth of a feed wheel or sprocket wheel interlocking with said clutch. With such system, electrical signals obtained from the feed holes or sprocket holes by photoelectric conversion means are shaped to be used as strobe signals for reading information out of each row of said memory apertures or as signals for stopping the tape so as to read information out of the following row of memory apertures. The prior art system, however, had the drawbacks that while the paper tape was used to obtain electrical signals from the feed holes thereof there are generated unnecessary electrical signals due to the deformation of the diameter of said feed holes or the damage of other apertures than said feed holes, thus leading to errors in the reading out operation most likely through the deteriorated signal-to-noise ratio of electrical signals used in feeding the tape, or the generation of wrong signals. Thus, there occurred a failure exactly to stop the clutch for feeding paper tape or the damaged feed holes caused reading to be erroneously conducted by taking wrong signals resulting therefrom for strobe signals for reading.

It is accordingly an object of the present invention to provide a tape reading-out system capable of exactly reading out information recorded in a tape-driving means.

Another object of the invention is to provide a tape reading-out system capable of exactly reading out tape information by generating strobe signals for such exact reading as well as by the aforementioned accurate control of the operation of the tape-driving means.

One of the features of the present invention is that it comprises a tape stored with information, a photoelectric means for reading information out of the tape, a tape-driving means provided with a clutch having rotary shafts so as to allow the tape to travel, a means for detecting signals directing the travel and stop of the tape, and a circuit for generating signals to control the operation of the clutch of the tape-driving means through control of the process of reading information out of tape using readout strobe signals corresponding to each station of the memory apertures formed in the tape and also for controlling the operation of the tape driving means by allowing the rotary shafts of the clutch to rotate or stop.

The other feature of the invention is that the readout strobe signals and clutch control signals are formed from the aforementioned directing signals detected from the displaced rotation of the rotary shafts of the clutch.

This invention can be more fully understood from the following detailed description when taken in connection with the accompanying drawings, in which.

Figure 1:
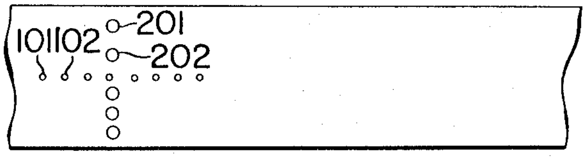
FIG. 1 is a plan view of the ordinary readout paper tape of an electronic computer.
Figures 2, 5, 8A, 8B:
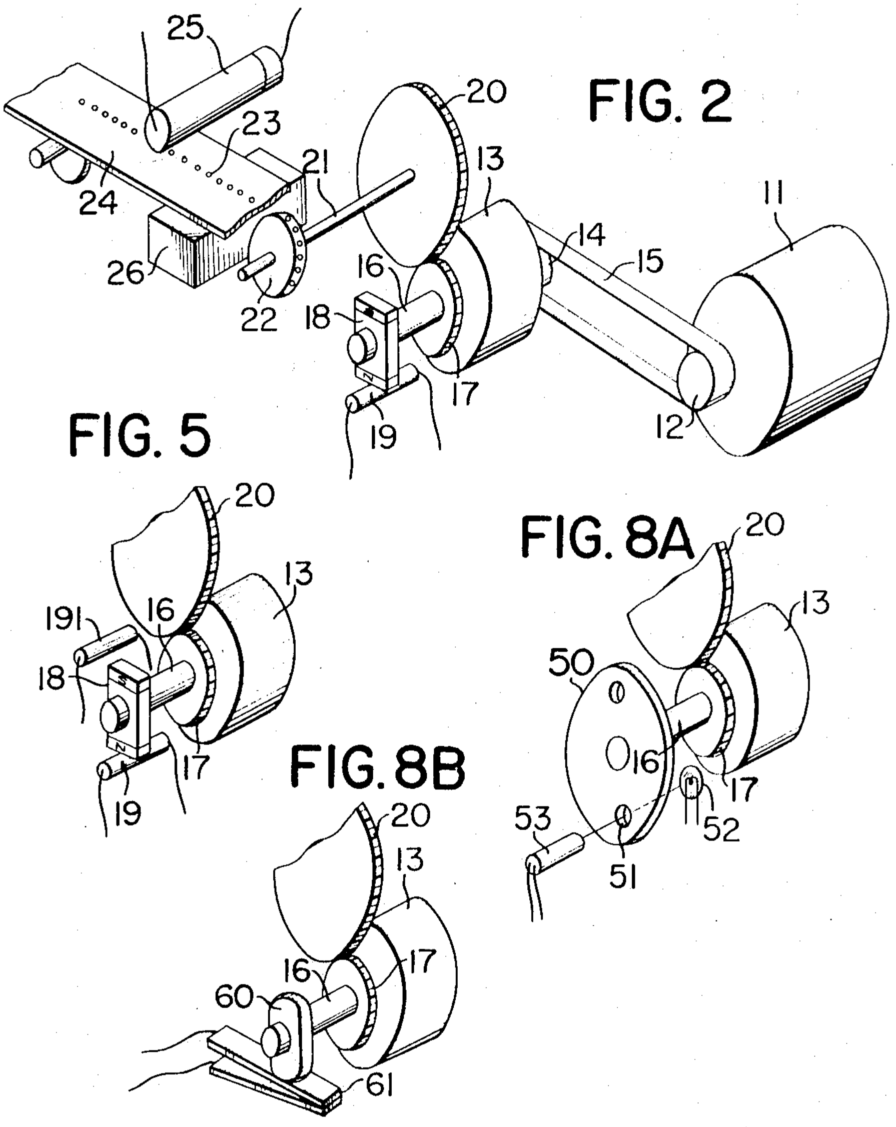
FIG. 2 is a schematic perspective view of a tape reading-out means according to an embodiment of the present invention.
FIG. 5 is a perspective view of another modification of the directing signal detecting means of FIG. 2 as taken out of the tape readout system.
FIGS. 8A and 8B are perspective views of other modifications from the directing signal detecting means of FIG. 2 as taken out of the tape readout system.
Figure 3:
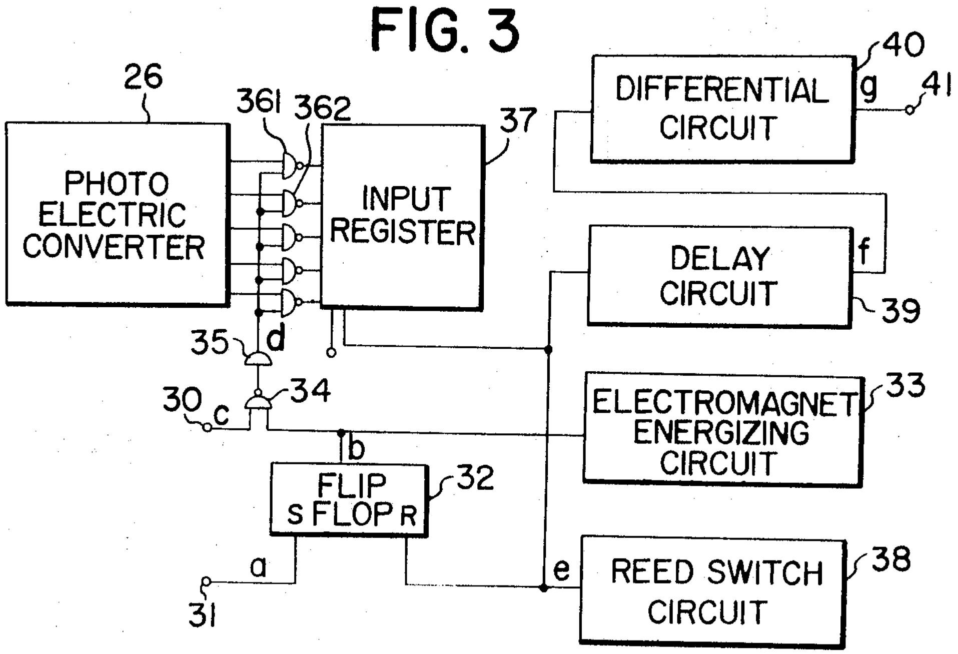
FIG. 3 is a block diagram of the control circuit system of the tape reading-out means of FIG. 2.

There will now be described the present invention by reference to the appended drawings. Referring to FIGS. 2 to 4, there is stretched a belt 15 across the rotary shaft 12 of a motor 11 and a rotary shaft 14 disposed on the input side of a clutch 13. To a rotary shaft 16 positioned on the output side of the clutch 13 are fixed a first gear 17 and magnet 18. The clutch 13 is so arranged as to allow the input side rotary shaft 14 and output side rotary shaft 16 to rotate jointly when the electromagnet contained in said clutch 13 is excited by electrical signals. Close to the magnet 18 is set a reed switch 19 enclosed in a glass tube. Said switch 19 has a normally closed contact which opens when the pole of the magnet 18 is drawn near thereto. With the aforementioned first gear 17 is normally engaged a second gear 20, to the rotary shaft 21 of which is coaxially fixed a sprocket wheel (or feed wheel) 22. There is allowed a tape 24 to be moved forward with the feed holes 23 registering with the projections on said sprocket wheel 22. At the point where the tape 24 is made to travel are installed a light source 25 and photoelectric conversion means 26 with the tape 24 interposed therebetween. The tape 24 is stored in advance with information by means of apertures. Said information is read out of the tape 24 after being converted to electrical signals by the photoelectric conversion means 26.

The rotation of the rotary shaft 12 of the motor 11 is transmitted throughout operation to the input side rotary shaft 14 of the clutch 13 so as to keep it rotating. When the clutch is supplied with electrical signals and the electromagnet disposed therein is excited to join the input side rotary shaft 14 with the output side rotary shaft 16, then the sprocket wheel 22 rotates through the first and second gears 17 and 20 to allow the projections formed on said wheel 22 to engage with the feed holes 23, thereby moving the tape 24 forward. At this time, the magnet 18 rotates due to the rotation of the output side rotary shaft 16 of the clutch 13. When the pole of said magnet 18 is brought near the reed switch 19, the contact thereof is opened to demagnetize the clutch 13 controlled by said reed switch 19, disengage the output side rotary shaft 16 from the input side rotary shaft 14, thereby decreasing the speed of the rotation of said output side rotary shaft 16 and in consequence that of the sprocket wheel 22 through the first and second gears 17 and 20, leading to the eventual stop of the travel of the tape 24 after a predetermined period of time.

Figures 4A, 4B, 4C, 4D, 4E, 4F, 4G:
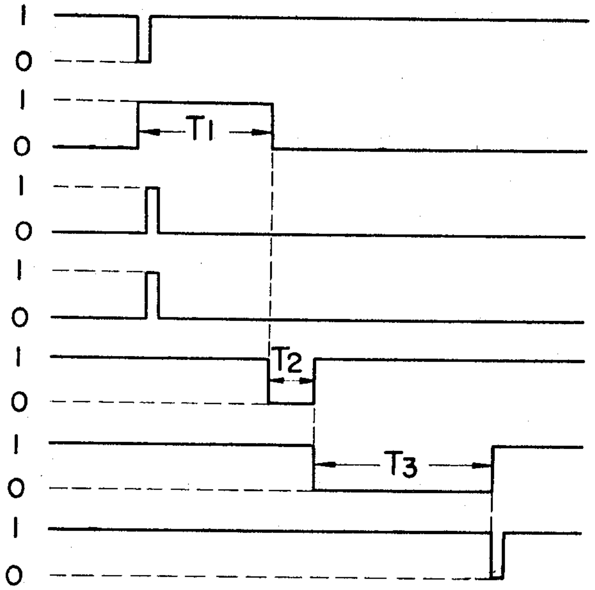
FIGS. 4A to 4G are time charts showing the voltage waveforms associated with the individual sections of the control circuit system of FIG. 3.

Referring to FIG. 3, when read start pulses from the electronic computer having such a voltage waveform as shown in FIG. 4A are supplied to a terminal 31 coupled to a flip-flop circuit 32, then there is set said circuit 32, allowing a pulse having a width $T_1$ and assuming a state [1] as shown in FIG. 4B to be taken out on the set side of said flip-flop circuit 32. Said pulse is supplied to a circuit 33 so as to excite the electromagnet of the clutch 13, causing the rotary shafts 14 and 16 on the input and output sides respectively of the clutch to be joined together, with the resultant travel of the tape 24 and rotation of the magnet 18 by means of the sprocket wheel 22 as described above. At this time, the output pulse from the flip-flop circuit 32 having a pattern as shown in FIG. 4B is also supplied to a first NAND circuit. On the other hand, during several milliseconds required for the electromagnet to be energized by the aforesaid circuit 33, there are supplied to the first NAND-circuit 34 through a terminal 30 clock pulses from the electronic computer which are generated by read-start pulses and have such a voltage waveform as shown in FIG. 4C, thereby obtaining an input gate pulse as illustrated in FIG. 4D through the NAND-circuit 34 and an inverter 35. Said input gate pulse is supplied to a plurality of second NAND-circuits 361, 362, .... When the aforementioned condition is attained, the information read out of the tape 24 by the photoelectric converter 26 is supplied to an input register 37 through said plurality of second NAND-circuits 361, 362, .... During the above cycle, information on one station of the tape is recorded in the register 37.

When the magnet 18 disposed on the output side rotary shaft 16 of the clutch 13 rotates to allow the pole thereof to be drawn near the reed switch 19, its normally closed contact is opened to generate on the output side of a reed switch circuit 38 an output signal [0] having width $T_2$ as shown in FIG. 4E. This output signal is supplied to the flip-flop circuit 32 to reset it, generating an output [0] on the set side. Accordingly, the aforesaid circuit 33 causes deenergization of the electromagnet of the clutch 13, disengaging the input side and output side rotary shafts 14 and 16 of the clutch 13 from each other, with the result that the rotation of the output side rotary shaft 16, the travel of the tape 24 and the rotation of the magnet 18 are all caused to stop. At this time an output signal [0] from the flip-flop circuit 32 is supplied to the first NAND-circuit 34, bringing an output from the inverter 35 to a state [0] to generate an output signal [1] from the second NAND-circuits 361, 362, ..., thereby stopping the recording of information read out by the photoelectric converter 26 into the input register 37, which is reset by an output signal [0] from the reed switch. On the other hand, an output signal from the reed switch 38 having a width $T_2$ shown in FIG. 4E is supplied to a delay circuit 39 which comprises, for example, a monostable multivibrator, to obtain a delayed output pulse having a width $T_3$ as measured from the leading time of said output signal from the reed switch 38 and kept in a state [0]. Said delayed output pulse is supplied to a differentiating circuit 40 to detect the leading of an input signal having a waveform as shown in FIG. 4G and take out the detected signal at a terminal 41 as a read-end pulse. This read-end pulse is supplied to the electronic computer, thus bringing the aforementioned control circuit system of FIG. 3 to a state waiting for the arrival of the following read-end pulse. In this case, the width $T_3$ of the delayed output pulse is so set as to correspond to the time delay of the tape-driving system resulting from its mechanical operation, the time delay corresponding to the time required for the tape to stop travelling. The signal having a waveform as shown in FIG. 4G may also be obtained by setting up another reed switch 191 as shown in FIG. 5 at a point displaced from the first mentioned reed switch 19 to an extent equivalent to the time difference of $T_2+T_3$ instead of using the above described delay circuit 39.

Figure 6:
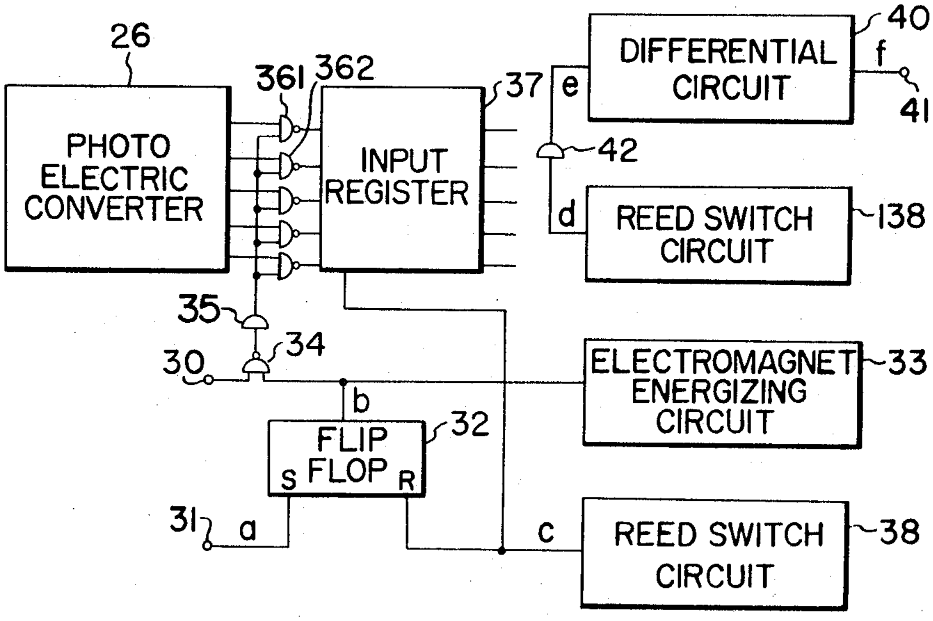
FIG. 6 is a block diagram of the control circuit system of a tape reading-out system of FIG. 5.
Figures 7A, 7B, 7C, 7D, 7E, 7F:
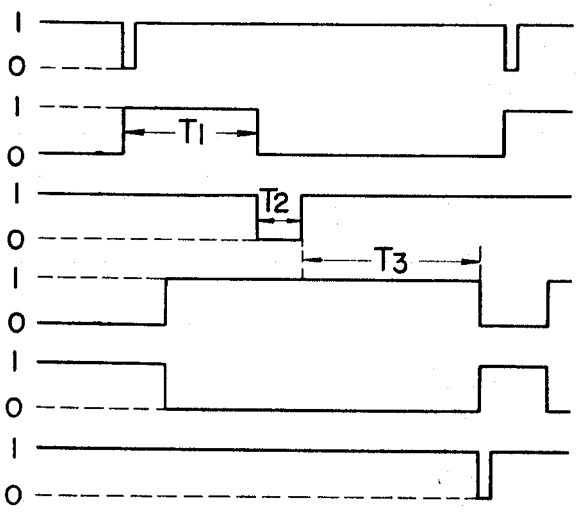
FIGS. 7A and 7F are time charts showing the voltage waveforms associated with the individual sections of the control circuit system of FIG. 6.
Figure 9:
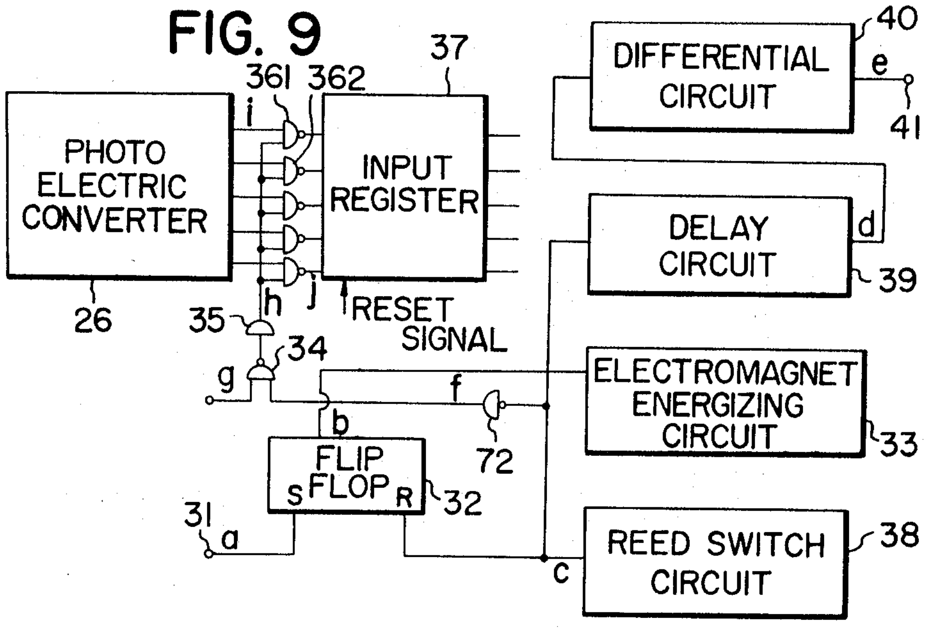
FIG. 9 is a block diagram of another modification of the control circuit system shown in FIG. 3.

The same parts of FIGS. 5 and 6 as those of FIGS. 2 and 3 are denoted by the same numerals and description thereof is omitted. Since the photoelectric reading out means and the electromagnet energizing circuit of FIGS. 5 and 6 are operated in the same manner as those of the preceding embodiments, description thereof is also omitted. When there are brought in read-start pulses having a waveform as shown in FIG. 7A, the flip-flop circuit 32 is so set as to generate a signal whose waveform is changed as shown in FIG. 7B. When, after a lapse of time $T_1$, there is supplied a stop directing signal having a waveform as shown in FIG. 7C from the first reed switch circuit to the flip-flop circuit 32, then the latter is reset. Even when, after a lapse of time $T_2$, the first reed switch 19 is closed, the tape reading-out system is not instantly brought to a state to wait for the arrival of the following read-start pulse, but there is allowed a time delay $T_3$ until there is introduced an output pulse from the second reed switch circuit 138. The output pulse from the second reed switch 138 is phase inverted by an inverter 42 to detect its leading time by a differentiation circuit 40 in the same manner as in the preceding embodiments, thereby forming a read-end pulse.

As mentioned above, the present invention has the following advantages: that electrical signals obtained from the feed holes formed in a tape are not used in controlling the operation of a clutch as is the case with the prior art system, but signals detecting the displaced rotation of the rotary shafts of the clutch are employed in said control circuit, enabling the signal-to-noise ratio to be elevated, the clutch to be stopped at an exact point and tape information to be correctly recorded into an input register, moreover, there is allowed an increased time margin for said stop because there are obtained stop signals from the rotary shafts of the clutch.

In addition to the process involved in the foregoing embodiments, the displaced rotation of the rotary shafts of the clutch may also be detected by providing a rotary disk 50 (FIG. 8A) coaxially with the rotary shaft 16 of the clutch, perforating holes 51 at prescribed points of said rotary disk 50 and optically detecting the position of these holes using a lamp 52 and photoelectric conversion element 53. Alternatively, it is possible to mount a cam 60 on a rotary shaft 16 of the clutch and control the metal contact 61 by said cam 60 according to a prescribed degree of displacement in the rotation of said rotary shaft 16 (FIG. 8B). Further, the system of the present invention does not always require the tape to be made of paper.

The directing signals-detecting means shown in FIGS. 2, 5, 8A, and 8B, is formed to generate two cycles of the directing signal per rotation of the shaft 16 but it is also possible that the detecting means is formed to generate one cycle or more than two cycles of the directing signal per rotation of the shaft.

Figures 10A, 10B, 10C, 10D, 10E, 10F, 10G, 10H, 10I, 10J:
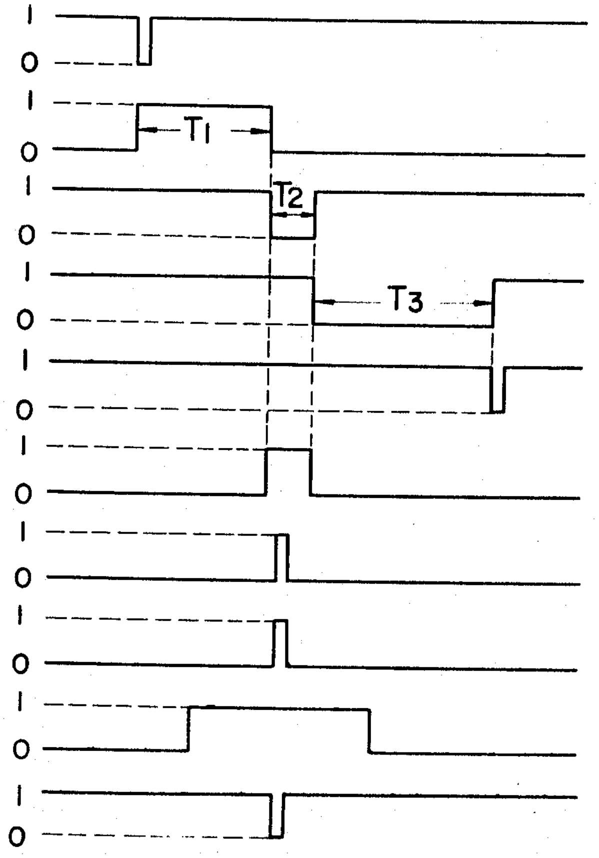
FIGS. 10A to 10J are time charts of the voltage waveforms associated with the individual sections of the control circuit system of FIG. 9.

There will now be described by reference to FIGS. 9 and 10A to 10J another modification of the control circuit system of FIG. 3 wherein the detected directing signal is utilized as a strobe signal for reading out information from each row of memory apertures formed in the tape as well as in controlling a circuit for driving the electromagnet of the clutch. The same parts of these figures as those of FIG. 3 are denoted by the same numerals and description thereof is omitted. Since the operations corresponding to FIGS. 10A to 10E are the same as those associated with FIGS. 4A to 4G, description thereof is omitted. A stop-directing signal from the reed switch circuit 38 is phase inverted by an inverter 72 into a waveform as shown in FIG. 10F, and the phase-inverted signal is supplied to the first NAND-circuit 34. Said circuit 34 is also supplied with a clock pulse generated by said stop-directing signal and having a waveform as shown in FIG. 10G. At this time, an output from the first NAND-circuit is brought to a state [0], and the input gates the second NAND-circuits 361, 362, ... are supplied through an inverter 35 with a signal [1] having a waveform as shown in FIG. 10H. If, at this time, there is supplied an information output signal [1] having a waveform as shown in FIG. 10I from the photoelectric converter 26 to the second NAND-circuits 361, 362, ... then the input register 37 is supplied with a set input pulse [0] having a waveform as shown in FIG. 10J to allow the information signal from the photoelectric converter 26 to be transmitted to the input register 37. Accordingly, transmission of said information signal to the input register 37 is controlled by the stop-directing signal, so that the action of strobe signals for controlling tape reading from each row of memory apertures can be achieved by said stop-directing signal without using an output signal from the sprocket wheel. The information introduced into the input register 37 is cleared by a reset signal. Further, said stop-directing signal resets the flip-flop circuit 32 and controls the electromagnet driving circuit 33, thereby releasing the input and output rotary shafts of the clutch from each other. Accordingly, the control circuit system of FIGS. 9 and 10A to 10J enables information to be read out of a tape while it is traveling. It will be apparent that with this control circuit system, the delay circuit means may consist of that shown in FIGS. 5 and 6 and the directing signal-detecting means may consist of that shown in FIGS. 8A and 8B.

In summary the present invention provides a tape reading-out system wherein electrical signals obtained from the output rotary shaft of the clutch for feeding a tape are used either as strobe signals for tape reading from each row of memory apertures or as those for stopping said output rotary shaft, thereby elevating the signal-to-noise ratio of electrical signals to generate strobe signals for correct tape reading or stopping the rotary shafts of the clutch exactly at a prescribed point so as to achieve accurate tape reading.

What is claimed is:

1. A tape readout system including:
 means for driving a tape having information stored at a plurality of stations on said tape, each station being spaced in the lengthwise direction of said tape, said tape having spaced feed holes formed in the lengthwise direction thereof in registration with said stations; and
 means for reading out said information from said tape on a station-by-station basis;
 said tape-driving means comprising:
  a motor;
  clutch means including an input side rotary shaft coupled to said motor for imparting rotation thereto, and an output side rotary shaft which is rotatably engaged with said input shaft only when said clutch means is energized;
  a sprocket wheel rotatably coupled to said output side rotary shaft and having projections thereon engaging with said feed holes of the tape for advancing said tape;
  circuit means responsive to a read-start signal for energizing said clutch means to impart rotation to said output side rotary shaft to thereby rotate said sprocket wheel for advancing said tape a predetermined distance corresponding to the spacing between stations, and for generating synchronizing signals for enabling the reading out of information from said tape by said readout means when the information at a station is in registration with said readout means,
  means coupled to said output side rotary shaft for generating a first directing signal for deenergizing said clutch means after said output side rotary shaft has rotated by a predetermined amount which corresponds to advancing said tape a distance less than said predetermined distance of tape advance, thereby disengaging said output rotary shaft from said input rotary shaft; and
  delay means for generating a read-end signal a specified length of time after generation of said first directing signal, said specified length of time being a function of the time required for said tape to actually stop travelling after deenergization of said clutch means.

2. The system according to claim 1 wherein said circuit means includes a flip-flop circuit which is set responsive to said read start signal to energize said clutch means.

3. The system according to claim 1 wherein said circuit means includes a source of clock pulses synchronized with said read-start signal, and wherein said readout means includes gating means responsive to said clock pulses and said synchronizing signals for synchronizing reading out of said information.

4. The system according to claim 3 wherein said circuit means includes a flip-flop circuit which is set responsive to said read-start signal to energize said clutch means, an output of said flip-flop circuit comprising said synchronizing signals and being coupled to said gating means.

5. The system according to claim 1 wherein the directing signal is a pulse signal and the delay means comprises a delay circuit connected to the directing signal generating means so as to delay the trailing edge of the directing signal pulse for a specified length of time and a differentiation circuit for detecting the trailing edge of the output pulse from said delay circuit so as to generate a read-end pulse.

6. The system according to claim 1 wherein said delay means comprises a second directing signal-generating means displaced from said first directing signal-generating means by a prescribed distance for generating a second directing signal a prescribed length of time after generation of the first directing signal, and means responsive to said second directing signal for generating said read-end signal.

7. The system according to claim 6 wherein said second directing signal is a pulse signal and said delay means includes a differentiation circuit responsive to the trailing edge of the second directing signal pulse so as to generate a read-end pulse.

8. The system according to claim 1 wherein said directing signal-generating means comprises a magnet connected to said output side rotary shaft of said clutch and a first reed switch opened and closed according to the position of the poles of said magnet.

9. The system according to claim 6 wherein the first directing signal-generating means comprises a magnet connected to said output side rotary shaft of said clutch and a first reed switch opened and closed according to the position and wherein said second directing signal generating means includes a second reed switch displaced from said first reed switch and opened and closed according to the position of the poles of said magnet.

10. The system according to claim 1 wherein said directing signal-generating means comprises a cam connected to the output side rotary shaft of said clutch and a switch whose contact is opened and closed according to the position of said cam.

11. The system according to claim 1 wherein said information is stored on said tape by a plurality of memory apertures therein formed in the crosswise direction thereof, and wherein said reading-out means includes:
 a source of light;
 a photoelectric converter for detecting transmission of said light through said memory apertures; and
 an input register for storing information signals readout by said photoelectric converter.

12. The system according to claim 10 wherein said reading-out means includes gating means coupled between said converter and said input register, and responsive to said synchronizing signals for gating said information signals to said input register when said information at a station is in registration with said readout means.

13. A tape readout system including:
 means for driving a tape having information stored at a plurality of stations on said tape, each station being spaced in the lengthwise direction of said tape, said tape having spaced feed holes formed in the lengthwise direction thereof in registration with said stations; and
 means for reading out said information from said tape on a station-by-station basis;
 said tape-driving means comprising:
  a motor;
  clutch means including an input side rotary shaft coupled to said motor for imparting rotation thereto, and an output side rotary shaft which is rotatably engaged with said input shaft only when said clutch means is energized;
  a sprocket wheel rotatably coupled to said output side rotary shaft and having projections thereon engaging with said feed holes of the tape for advancing said tape;
  circuit means responsive to a read-start signal for energizing said clutch means to impart rotation to said output side rotary shaft to thereby rotate said sprocket wheel for advancing said tape a predetermined distance corresponding to the spacing between stations;
  means coupled to said output side rotary shaft for generating a first directing signal for deenergizing said clutch means after said output side rotary shaft has rotated by a predetermined amount which corresponds to advancing said tape a distance less than said predetermined distance of tape advance, thereby disengaging said output rotary shaft from said input rotary shaft;
  means coupled to said first directing signal-generating means for generating synchronizing signals for enabling the reading out of information from said tape by said readout means when the information at a station is in registration with said readout means; and delay means for generating a read-end signal a specified length of time after generation of said first directing signal, said specified length of time being a function of the time required for said tape to actually stop traveling after deenergization of said clutch means.

14. The system according to claim 13 wherein said circuit means includes a flip-flop circuit which is set responsive to said read-start signal to energize said clutch means.

15. The system according to claim 13 wherein said circuit means includes a source of clock pulses synchronized with said first directing signal, and wherein said readout means includes gating means responsive to said clock pulses and said synchronizing signals for synchronizing reading out of said information.

16. The system according to claim 13 wherein the directing signal is a pulse signal and the delay means comprises a delay circuit connected to the directing signal-generating means so as to delay the trailing edge of the directing signal pulse for a specified length of time and a differentiation circuit for detecting the trailing edge of the output pulse from said delay circuit so as to generate a read-end pulse.

17. The system according to claim 13 wherein said delay means comprises a second directing signal-generating means displaced from said first directing signal-generating means by a prescribed distance for generating a second directing signal a prescribed length of time after generation of the first directing signal, and means responsive to said second directing signal for generating said read-end signal.

18. The system according to claim 13 wherein said directing signal-generating means comprises a magnet connected to said output side rotary shaft of said clutch and a first reed switch opened and closed according to the position of the poles of said magnet.

19. The system according to claim 13 wherein said directing signal-generating means comprises a cam connected to the output side rotary shaft of said clutch and a switch whose contact is opened and closed according to the position of said cam.

* * * * *